United States Patent
Chiasson et al.

(10) Patent No.: US 10,725,256 B2
(45) Date of Patent: Jul. 28, 2020

(54) FLEXIBLE OPTICAL FIBER RIBBON WITH RIBBON BODY FLEXIBILITY RECESSES

(71) Applicant: CORNING OPTICAL COMMUNICATIONS LLC, Hickory, NC (US)

(72) Inventors: David Wesley Chiasson, Edmonton (CA); Barada Kanta Nayak, Painted Post, NY (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/427,041

(22) Filed: May 30, 2019

(65) Prior Publication Data
US 2019/0293886 A1 Sep. 26, 2019

Related U.S. Application Data

(62) Division of application No. 15/346,069, filed on Nov. 8, 2016, now Pat. No. 10,330,876.

(60) Provisional application No. 62/260,715, filed on Nov. 30, 2015.

(51) Int. Cl.
G02B 6/44 (2006.01)

(52) U.S. Cl.
CPC ........... *G02B 6/4403* (2013.01); *G02B 6/443* (2013.01); *G02B 6/4404* (2013.01); *G02B 6/4411* (2013.01)

(58) Field of Classification Search
CPC ....... G02B 6/443; G02B 6/448; G02B 6/4404
See application file for complete search history.

(56) References Cited

U.S. PATENT DOCUMENTS

| 4,680,423 | A  | 7/1987  | Bennett et al. |
| 4,861,135 | A  | 8/1989  | Rohner et al. |
| 5,982,968 | A  | 11/1999 | Stulpin |
| 6,853,783 | B2 | 2/2005  | Chiasson et al. |
| 7,039,282 | B2 | 5/2006  | Chiasson et al. |
| 7,085,459 | B2 | 8/2006  | Conrad et al. |
| 7,532,796 | B2 | 5/2009  | Chiasson |

(Continued)

FOREIGN PATENT DOCUMENTS

| CN | 201145756 Y | 11/2008 |
| CN | 201273235 Y | 7/2009 |

(Continued)

OTHER PUBLICATIONS

Chinese Patent Application No. 201680078280.5; English Translation of the First Office Action dated Jul. 29, 2019; China Patent Office; 11 Pgs.

(Continued)

*Primary Examiner* — Thomas A Hollweg
*Assistant Examiner* — Mary A El-Shammaa
(74) *Attorney, Agent, or Firm* — William D. Doyle

(57) ABSTRACT

A flexible optical ribbon and associated method is provided. The ribbon includes a plurality of optical transmission elements and a polymeric ribbon body surrounding the plurality of optical transmission elements. The ribbon body includes a plurality of recesses formed in the ribbon body, and each recess has a depth extending from the first major surface toward the plurality of optical transmission elements and a length extending along the ribbon body between a first recess end and a second recess end. The first recess end is defined by a concave curved surface of the polymeric ribbon body.

5 Claims, 3 Drawing Sheets

(56) References Cited

U.S. PATENT DOCUMENTS

| | | |
|---|---|---|
| 8,412,014 B2 | 4/2013 | Sato et al. |
| 2004/0170364 A1 | 9/2004 | Chiasson et al. |
| 2006/0002669 A1 | 1/2006 | Chiasson et al. |
| 2006/0045443 A1 | 3/2006 | Blazer |
| 2007/0098339 A1 | 5/2007 | Bringuier et al. |
| 2008/0080822 A1 | 4/2008 | Chiasson |
| 2008/0205832 A1 | 8/2008 | Cook |
| 2008/0240660 A1 | 10/2008 | Nave et al. |
| 2009/0190890 A1 | 7/2009 | Freeland et al. |
| 2011/0229098 A1 | 9/2011 | Abernathy et al. |
| 2013/0209045 A1 | 8/2013 | Dean, Jr. et al. |
| 2013/0279866 A1 | 10/2013 | Wells et al. |

FOREIGN PATENT DOCUMENTS

| | | |
|---|---|---|
| CN | 103331697 A | 10/2013 |
| EP | 2239608 A1 | 10/2010 |
| JP | 05200093 B2 | 5/2013 |

OTHER PUBLICATIONS

Hoshino, et al., "Development of Rollable Optical Fiber Ribbon and Ultra High Density Cable," International Wire & Cable Symposium, Proceedings of the 61st IWCS Conference, Nov. 11, 2014-Nov. 14, 2014, pp. 31-36, http://www.iwcs.org/archives/56333-iwcs-2012b-1.1584632/t-001-1.1585113/f-002-1.1585458/2-3-1.1585468/2-3-1.1585469.

International Search Report and Written Opinion PCT/US2016/057604 dated Jan. 19, 2017.

Satou et al., "Design of Ultra-High-density Optical Fiber Cable with Rollable 4-fiber Ribbons for Aerial Deployment," International Wire & Cable Symposium, Proceedings of the 61st IWCS Conference, Nov. 11, 2014-Nov. 14, 2014, pp. 433-436, http://www.iwcs.org/polopoly_fs/1.1585307.1417722639!/fileserver/file/313653/filename/P-4.pdf.

Takeda et al., "Ultra-High-Density Optical Cable with Rollable Ribbons for Simple Installation and Cost Reduction," SEI Technical Review, No. 29, Oct. 2014, pp. 72-76, http://global-sei.com/technology/tr/bn79/pdf/79-14.pdf.

Takeda, et al., "Ultra-High-Density Optical Fiber Cable," Fujikura Technical Review, 2014, pp. 6-8, http://www.fujikura.co.jp/eng/rd/gihou/backnumber/pages/__icsFiles/afieldfile/2014/07/04/43e_02.pdf.

FLEXIBLE OPTICAL FIBER RIBBON WITH RIBBON BODY FLEXIBILITY RECESSES

CROSS-REFERENCE TO RELATED APPLICATIONS

This application is a divisional of U.S. application Ser. No. 15/346,069, filed on Nov. 8, 2016, which claims the benefit of priority to U.S. Application No. 62/260,715, filed on Nov. 30, 2015, both applications being incorporated herein by reference.

BACKGROUND

The disclosure relates generally to optical fibers and more particularly to optical communication or fiber ribbons. Optical fibers have seen increased use in a wide variety of electronics and telecommunications fields. Optical fiber ribbons may hold multiple optical fibers together in a group or array. The optical fiber ribbon includes a body formed from a material that holds the optical fibers together and/or that provides structure that assists in the handling and connecting of the optical fibers of the ribbon to various components or devices.

SUMMARY

One embodiment of the disclosure relates to a flexible optical ribbon having a plurality of optical transmission elements each having a longitudinal axis, and a polymeric ribbon body coupled to, supporting and surrounding the plurality of optical transmission elements, the ribbon body defining a width axis, a length axis and a height axis, the ribbon body including a first major surface on one side of the plurality of optical transmission elements, and a second major surface on the other side of the plurality of optical transmission elements, wherein the height axis is an axis perpendicular to both the first and second major surfaces of the ribbon body, the length axis extends parallel to the longitudinal axes of the optical transmission elements, and the width axis extends perpendicular to both the height axis and the length axis; and a first plurality of recesses formed in the ribbon body, each recess having a depth extending from the first major surface toward the plurality of optical transmission elements and a length extending along the ribbon body between a first recess end and a second recess end; wherein the first recess end is defined by a concave curved surface of the polymeric ribbon body having at least three radiuses of curvature, one in the plane of the height axis, one in the plane of the longitudinal axis and one in the plane of the width axis.

An additional embodiment of the disclosure relates to an optical ribbon including a plurality of optical transmission elements each having a longitudinal axis; and a multi-layer polymeric ribbon body coupled to, supporting and surrounding the plurality of optical transmission elements, the polymeric ribbon body having a plurality of inner layer segments formed from a first polymeric material, each inner layer segment is a contiguous polymer structure at least partially surrounding at least two of the optical transmission elements and having an inner surface contacting outer surfaces of the at least two optical transmission elements; and a single contiguous outer layer formed from a second polymeric material and surrounding all of the inner layer segments such that outer surfaces of the inner layer segments contact the outer layer and the outer layer defines a first major surface on one side of the plurality of optical transmission elements and a second major surface on the other side optical transmission elements, wherein a portion of the outer layer is located between each adjacent inner layer segment such that all of the inner layer segments are held together by the outer layer; wherein the first major surface defines a first profile, the first profile shaped such that, when viewed in lateral cross-section, a distance between the first and second major surfaces decreases toward a minimum located between adjacent pairs of inner layer segments, wherein the first profile includes a concave curved surface at the minimum thickness, the curved surface having a radius of curvature greater than 0.05 mm.

An additional embodiment of the disclosure relates to a method of forming a flexible optical ribbon that includes providing an optical fiber ribbon including a plurality of optical fibers embedded in and surround by a polymeric ribbon body having an outer surface; and removing portions of the polymeric ribbon body with a laser such that a plurality of recesses are formed along the outer surface of the ribbon body, wherein each of the recesses is defined, at least in part, by a curved section of the outer surface of the ribbon body, the curved section having a radius of curvature greater than 0.05 mm, the radius of curvature reducing stress concentration within the recess.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
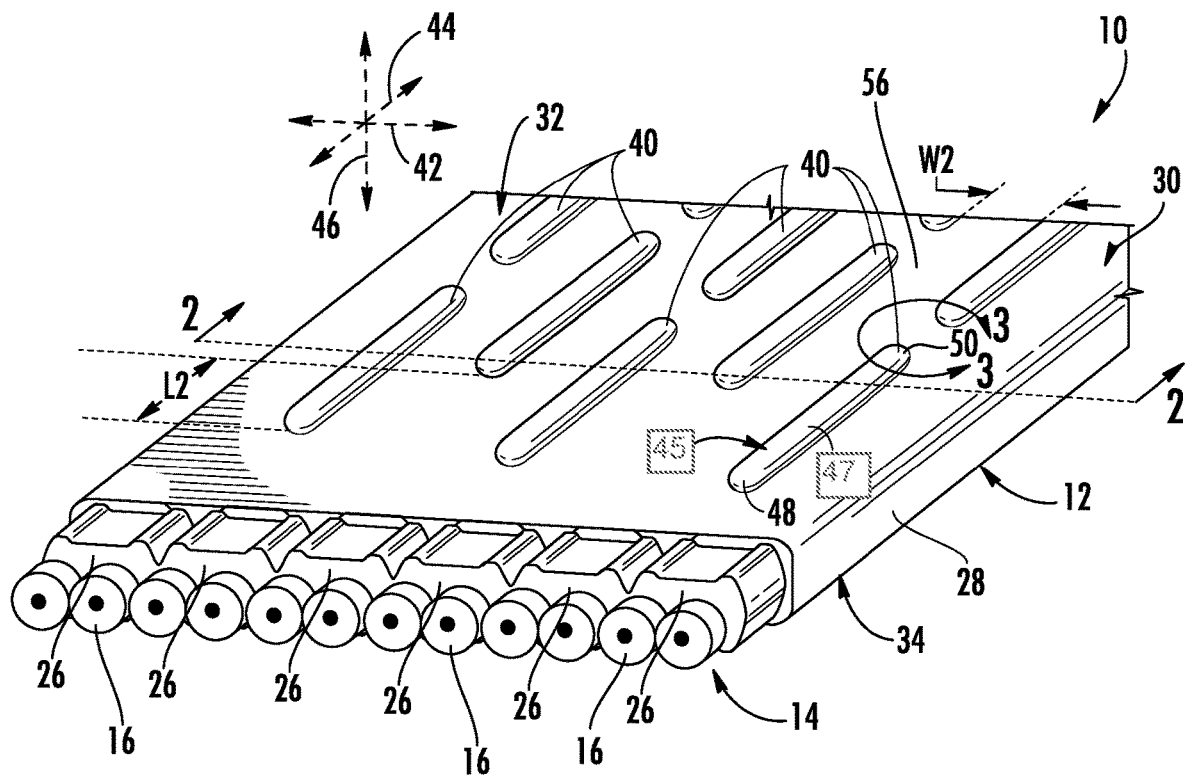
FIG. 1 shows a perspective view of a flexible optical fiber ribbon according to an exemplary embodiment.

Referring generally to the figures, various embodiments of an optical ribbon are shown. In general, the ribbon embodiments disclosed herein are configured to provide improved flexibility while also limiting the potential for unwanted cracking or splitting within the ribbon body or matrix. In various embodiments, optical transmission elements (e.g., optical fibers) are coupled to and supported by a ribbon body. The ribbon body is formed from a material, such as a polymer material, and is configured to provide sufficient support, structure and protection to the optical fibers of the ribbon, while at the same time allowing the ribbon to be bent during installation, use, etc. Specifically, the optical fiber ribbon discussed herein includes a plurality of recesses formed in the ribbon body, and by providing areas of decreased ribbon matrix thickness the flexibility of the ribbon is improved.

The recesses of the ribbon embodiments discussed herein are formed having one or more rounded or radiused surfaces defined by curved surface of the ribbon body located at the end of each recess and/or along the bottom of the recess. In contrast to some flexible fiber optic ribbon designs that include rectangular or angularly shaped flexibility structures, Applicant has found that a rounded recess shape reduces stress concentration (as compared to angular designs), which in turn improves ribbon performance by reducing the chance of unwanted ribbon splitting that may otherwise tend to form at stress concentration sites within squared recesses.

In particular embodiments, Applicant has developed a ribbon including recesses with curved end sections that are defined by at least three radiuses of curvature, one in each of the orthogonal planes, and Applicant believes that such design provides superior split resistance performance. As generally be understood, flexible ribbon body designs typically involve a trade-off between flexibility and structural integrity. Utilizing the designs discussed herein, Applicant believes that ribbon body design discussed herein allows for a more flexible ribbon at a given level of structural integrity as compared to other flexible ribbon designs, particularly those that utilize rectangular or angular flexibility features.

In various embodiments, Applicant has also developed a method for forming the rounded recesses discussed herein. In particular embodiments, a laser tool (e.g., an ablation laser) is used to remove material from the ribbon body to form the recesses having the structures and shapes discussed herein. Further, Applicant believes that, by using laser cutting, the rounded flexibility recesses discuss herein can be formed precisely and with little variability between the shape and position of discrete recesses. In such laser cutting based processes, the shape of the formed recesses are formed by controlling one or more aspects of the laser, such as laser power, focal point geometry, intensity profile, etc., to form a recess having the desired rounded shape.

Figure 2:
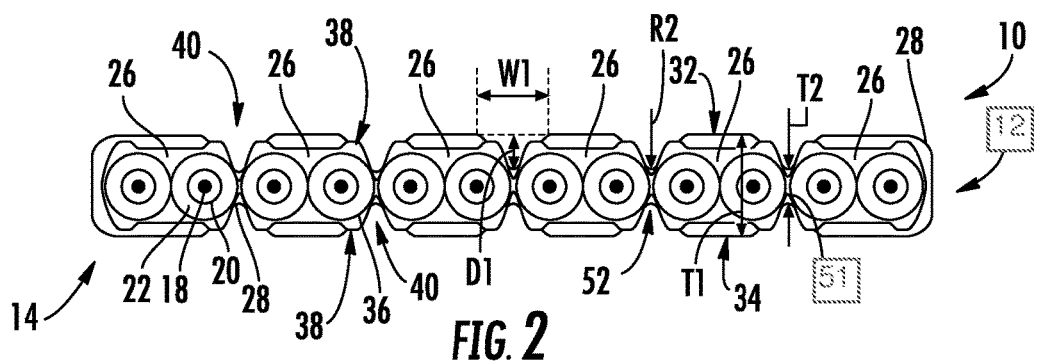
FIG. 2 shows a cross-sectional view of the optical fiber ribbon of FIG. 1 taken along the line 2-2 according to an exemplary embodiment.

Referring to FIG. 1 and FIG. 2, an optical ribbon, such as optical fiber ribbon 10, is shown according to an exemplary embodiment. Ribbon 10 includes a ribbon body, shown as ribbon matrix 12, and also includes an array 14 of a plurality of optical transmission elements, shown as optical fibers 16. Optical fibers 16 are surrounded by and embedded in the material of ribbon matrix 12, such that ribbon matrix 12 is coupled to and supports optical fibers 16. In the embodiment shown, array 14 is a parallel array of optical fibers in which the longitudinal axes of each optical fiber 16 (the axis of each optical fiber 16 perpendicular to the lateral cross-section shown in FIG. 2) are substantially parallel to each other. In other embodiments, the optical fibers may be arranged in non-parallel arrays within ribbon body 12 (e.g., two by two arrays, staggered arrays, etc.).

In the embodiment shown, ribbon 10 includes a single linear array 14 of optical fibers 16. In some other embodiments, ribbon 10 includes multiple arrays 14 of optical fibers 16. In some embodiments, ribbon 10 includes at least two linear arrays 14. In some other embodiments, ribbon 10 includes at least four linear arrays 14. In still other embodiments, ribbon 10 includes at least eight linear arrays 14. In yet still other embodiments, ribbon 10 includes at least 16 linear arrays 14. In some embodiments, each linear array 14 of ribbon 10 has at least two optical fibers 16. In some other embodiments, each linear array 14 of ribbon 10 has at least four optical fibers 16. In still other embodiments, each linear array 14 of ribbon 10 has at least 8 optical fibers 16. In yet still other embodiments, each linear array 14 of ribbon 10 has at least 12 optical fibers 16.

In the embodiment shown, each optical fiber 16 in array 14 is the same as the other optical fibers 16. As will be generally understood, optical fibers 16 include an optical core 18, surrounded by a cladding layer 20. In various embodiments, optical fibers 16 also each include a coating layer 22. Optical core 18 is formed from a material that transmits light, and optical core 18 is surrounded by a cladding layer 20 that has a different refractive index (e.g., a lower refractive index) than the optical core 18, such that optical fiber 16 acts as a waveguide that retains a light signal within optical core 18.

Coating layer 22 surrounds both optical core 18 and cladding layer 20. In particular embodiments, coating layer 22 is bonded to the outer surface of cladding layer 20, and the outer surface of coating layer 22 defines the outer surface of each optical fiber 16. In general, coating layer 26 is a layer of one or more polymer materials (e.g., UV curable polymer materials) formed from a material that provides protection (e.g., protection from scratches, chips, etc.) to optical fibers 16. In one embodiment, the diameter of optical fiber 16 is about 250 µm.

As noted above, ribbon body 12 is structured to provide flexibility while limiting stress concentrations that may produce unwanted cracking or separation within ribbon body 12 during use, handling, installation, etc. In the embodiment shown, ribbon matrix 12 includes a plurality of inner layer segments 26 and an outer layer 28. Each inner layer segment 26 is formed from a single continuous layer of polymeric material and includes an inner surface that is in contact with the outer surfaces of optical fibers 16. In this arrangement, optical fibers 16 are embedded in, and each fiber is at least partially surrounded by, the material of an inner layer segment 26. In such embodiments, inner layer segments 26 are bonded, adhered or coupled to the outer surface of each optical fiber 16 surrounded by the segment, and specifically are coupled to the outer surface of fiber coating 22.

In the embodiment shown, each inner layer segment 26 surrounds at least two optical fibers 16. In the particular embodiment shown, each inner layer segment 26 surrounds two optical fibers 16. In other embodiments, inner layer segment 26 may surround 3, 4, 5, 6, etc. optical fibers 16. In another embodiment, ribbon body 12 may include a single inner layer 26 that surrounds all of the optical fibers 16 of ribbon 10. In general, inner layer segments 26 facilitate splitting out and connecting pairs or groups of fibers that are to remain together following splitting of outer layer 28.

Outer layer 28 is a single contiguous layer of polymeric material that surrounds inner layer segments 26. Outer layer 28 includes an inner surface that is in contact with an outer surface of inner layer segments 26. Further, outer layer 28 has an outer surface 30 that includes a first major surface, shown as upper surface 32, and a second major surface, shown as lower surface 34.

In some embodiments, outer layer 28 and inner layer 26 may be formed from the same type of material. In other embodiments, outer layer 28 is formed from one type of polymer material and inner layer 26 is formed from another type of material. In some embodiments, inner layer segments 26 may be formed from a low modulus material, and outer layer 28 may be formed from a high modulus material. In other embodiments, inner layer segments 26 may be formed from a high modulus material, and outer layer 28 may be formed from a low modulus material. In one embodiment, inner layer segments and outer layer 28 are formed from UV curable acrylate materials. In other embodiments, inner layer segments 26 and/or outer layer 28 may be formed from thermoplastic or thermoset materials.

In various embodiments, inner layer 26 has a lateral cross-sectional shape configured to reduce stress concentration and unwanted splitting of ribbon body 12. In the embodiment shown, each inner layer 26 includes thickened end sections 36. Each end section 36 has outer surfaces 38 at both the upper and lower ends of thickened end sections 36. In some embodiments in which portions of outer layer 28 are removed forming flexibility grooves, portions of outer surfaces 38 become exposed within the grooves defining a portion of the outermost surface of ribbon 10 within the grooves.

Referring to FIG. 1, ribbon 10 includes a plurality of recesses, shown as grooves 40. In general, grooves 40 are formed in a pattern along the length of ribbon 10, and through the alternating pattern of increased and decreased ribbon body thickness provided by grooves 40, flexibility of ribbon 10 is increased (e.g., relative to a ribbon body without grooves 40). As a frame of reference, the position of the various components and features of ribbon 10 can be described in relation to a width axis 42, a length axis 44 and a height axis 46. As shown in FIG. 1, height axis 46 is perpendicular to upper surface 32 and to lower surface 34, and generally defines the thickness dimension of ribbon 10. Length axis 44 extends longitudinally and generally parallel to the longitudinal axes of the optical fibers 16, and width axis 42 extends generally perpendicular to height axis 46, to length axis 44 and to the longitudinal axes of optical fibers 16.

In general, grooves 40 are depressions formed in ribbon body 12, such that grooves 40 extend inward from upper surface 32 toward optical fibers 16. As shown, grooves 40 are generally defined, at least in part, by a shaped outer surface portion 45 of upper surface 32. As shown in FIG. 2, ribbon 10 includes a second group of grooves 40 located along lower surface 34. The lower set of grooves 40 extend inward from lower surface 34. It should be understood that while the description of the flexibility recesses of ribbon 10 are described herein in relation primarily to grooves 40 located at upper surface 32, grooves 40 located on lower surface 34 may include any combination of structures, shapes, dimensions, etc. discussed herein.

As shown in FIG. 1, each groove 40 has a central portion 47 extending between opposing ends 48 and 50. As shown best in FIGS. 2 and 3, each of the opposing ends 48 and 50 are defined by a concave curved surface, shown as curved surfaces 52 and 54, formed in ribbon body 12. Concave curved surfaces 52 and 54 each have at least one radius of curvature R1 in at one least one of the height axis plane, the length axis plane or the width axis plane. In the various embodiments, concave curved surfaces 52 and 54 are defined by curvatures in all of the three orthogonal planes, and in such embodiments, concave curved surfaces 52 and 54 each have three radiuses of curvature, one in the height axis plane, the length axis plane and the width axis plane, which define the surface curvature. In the specific embodiment shown, concave curved surfaces 52 and 54 are substantially partial spherical surfaces having three equal radiuses of curvature R1, one in the height axis plane, the length axis plane and the width axis plane, which define the surface curvature. In such spherical embodiments, each of the radiuses of curvature within each orthogonal plane is within 1% of each other, and more specifically within 0.1% of each other, resulting in a partial substantially spherical surface.

In various embodiments, the shape of the concave curved surfaces 52 and 54 are designed to provide both flexibility to ribbon 10 and improved crack resistance. It is believed that improved crack resistance is provided by the curved surfaces discussed herein by reducing stress concentration that otherwise tends to occur at the corners of more rectangular/angular ribbon body flexibility structures. In various embodiments, R1 in one or more of the height axis plane, the length axis plane and the width axis plane is greater than 0.05 mm, specifically is between 0.05 mm and 0.125 mm, and more specifically is about 0.1 mm (e.g., 0.1 mm plus or minus 1%). In specific embodiments, as shown best in FIG. 3, R1 in one or more of the height axis plane, the length axis plane and the width axis plane is substantially equal to (e.g., within plus or minus 1%) half of groove width, W1. In such embodiments, W1 is between 0.1 mm and 0.3 mm, and specifically is about 0.25 mm (e.g., 0.1 mm plus or minus 1%). In various embodiments, concave surfaces 52 and 54 have the same radiuses of curvature as each other, such that each groove 40 is symmetrical about its midpoint in the length direction and is also symmetrical about its midpoint in the width direction.

In particular embodiments, it is believed that the combination of curved surfaces forming grooves 40 and the enlarged end portions 36 of inner layer segments 26 provide a structure that improves crack resistance. Further, the double layered structure of ribbon body 12 discussed herein may allow for the removal of additional material of ribbon body 12 forming larger grooves as compared to a similar groove structure formed in a single layered ribbon body, which in turn increases ribbon flexibility.

Referring to FIG. 2, upper and lower surfaces 32 and 34 of ribbon body 12, including those portions forming grooves 40, define a profile that extends the width of ribbon 10, when viewed in lateral cross-section. In such embodiments, the profile defined by ribbon body 12 is shaped such that ribbon body 12 has a maximum thickness, T1, at a location toward the center of each inner layer segment 26, at a position generally above optical fibers 16. The profiles on both upper and lower surfaces 32 and 34 slope inward toward a minimum thickness, T2, located at a position between adjacent pairs of inner layer segments 26. In the embodiment shown, portions 51 of outer layer 28 is located between each adjacent pair of inner layer segments 26 and acts to hold together ribbon 10 by providing a common structure connected to each adjacent inner layer segments 26.

In various embodiments, T2 is selected to be thin enough that ribbon 10 is flexible and allows the ribbon segments to be separated by a user, for example tearing or cutting when desired, while at the same time being thick enough that ribbon matrix 12 is resistant to unwanted tearing. The minimum thickness is located at a position along the height axis between the upper most and lower most surfaces of adjacent optical fibers 16. In this arrangement, the minimum thickness is at a position recessed below both the upper and lower outer surfaces of optical fibers 16 and is generally centered at the middle plane of the ribbon 10. In various embodiments, T2 is less than the outer diameter of optical fibers 16 and more specifically is less than 50% of the outer diameter of optical fibers.

As shown best in FIG. 2, each groove 40 includes a curved bottom surface 52 that is located at the point of the minimum thickness T2. Curved bottom surface 52 is the portion of the profile that defines the transition from the minimum thickness to the groove sidewalls that extend upward toward the maximum thicknesses T1. Curved bottom surface 52 is also defined by a radius of curvature R2, and in the particular embodiment shown, the value of R2 is same as the radius of curvature that defines the groove ends R1, as discussed above. In other embodiments, curved bottom surfaces 52 may have a different radius of curvature that may be either greater than or less than R1.

Figure 3:
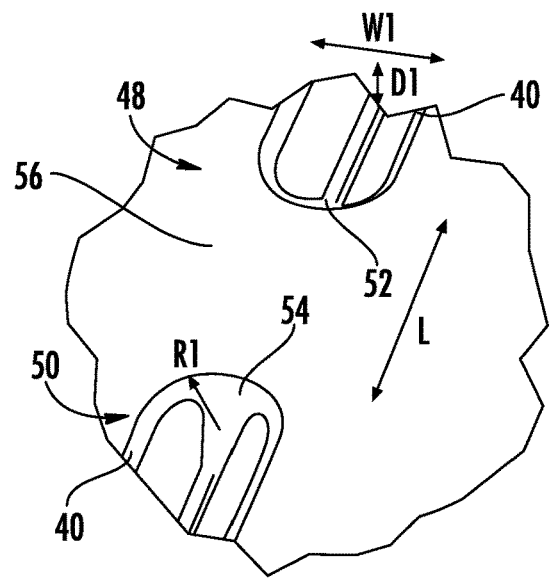
FIG. 3 shows a detailed view of a portion of the outer surface of the optical fiber ribbon of FIG. 1 according to an exemplary embodiment.

Referring to FIG. 1 and FIG. 3, grooves 40 are arranged in pattern along outer surfaces 32 and 34. In one embodiment, the pattern of grooves 40 on upper surface 32 is the same as the pattern of grooves on lower surface 34, and in a specific embodiment, the patterns on both upper surface 32 and lower surface 34 are positioned at the same location as each other such that the profile of the outer surface of ribbon body 12 is symmetrical about the middle plane of ribbon 10 (e.g., a plane in the width axis intersecting the center points of optical fibers 16).

As shown in FIG. 1, grooves 40 are discrete grooves arranged such that areas of unrecessed (e.g., substantially planar) portions 56 of outer surfaces 32 and 34 are located between adjacent grooves 40. Grooves 40 are arranged in longitudinally aligned columns in which a section of unrecessed outer surface portions 56 spaces each groove 40 from the longitudinally adjacent groove. As shown in FIG. 3, unrecessed outer surface portions 56 have a length L1 in the longitudinal direction, and in various embodiments, L1 is between 1 mm and 15 mm, specifically between 3 mm and 7 mm, and more specifically is about 5 mm (e.g., 5 mm plus or minus 1%). It is believed that the L1 spacing provided by the ribbon body discussed herein is relatively low (resulting in increased groove density) which in turn increases ribbon flexibility. It is further believed that because of the relatively large radiuses of curvature, R1, defining the shape of grooves 40, and the resulting reduction in stress concentrations, L1 is lower than in at least some other ribbon designs that utilize a more rectangular/angled profile to form flexibility enhancing structures.

As shown in FIG. 1, grooves 40 are also spaced from each other in the direction of width axis 42 such that grooves 40 form rows across the width of ribbon 10. In this arrangement, a section of unrecessed outer surface portions 56 spaces each groove 40 from the widthwise adjacent groove 40. As shown in FIG. 1, unrecessed outer surface portions 56 have a width W2 in the width direction, and in various embodiments.

In various embodiments, as shown in FIG. 1 and FIG. 2, each longitudinal column of grooves 40 is located at an aligned position between adjacent inner layer segments 26. This arrangement results in the positioning of the areas of minimum thickness, T2, discussed above, which in turn provides points of flexibility between the adjacent inner layer segments 26. Further, adjacent columns of grooves 40 are staggered relative to each other as shown by the dimension L2.

Figure 4:
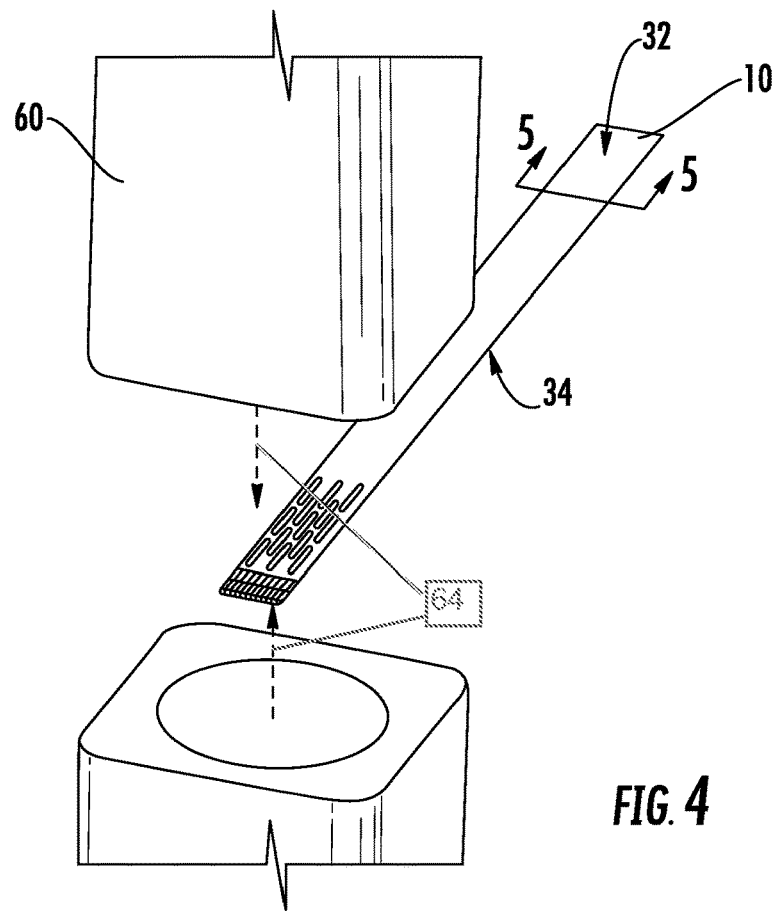
FIG. 4 shows a system and process for forming a flexible optical fiber ribbon according to an exemplary embodiment.
Figure 5:
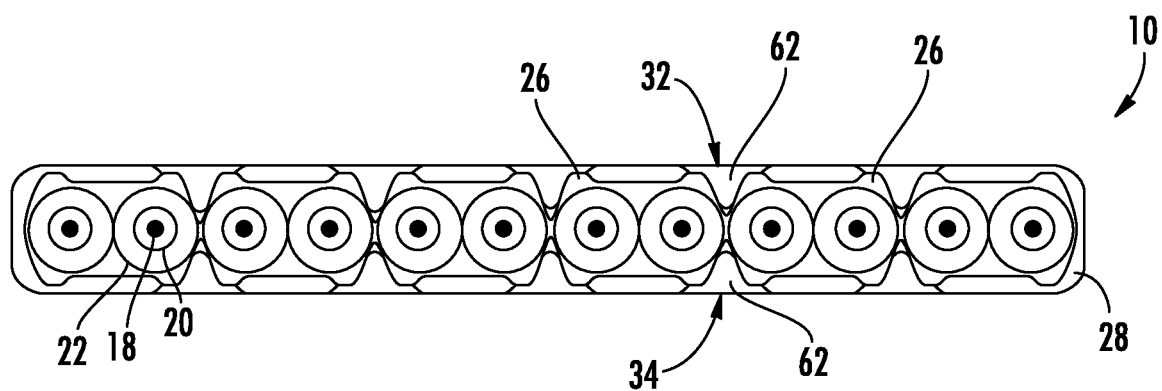
FIG. 5 shows a cross-sectional view of an optical fiber ribbon prior to recess formation according to an exemplary embodiment.

Referring to FIG. 4 and FIG. 5, a method of forming a flexible optical ribbon, such as ribbon 10, is shown according to an exemplary embodiment. As shown in FIG. 4, optical fiber ribbon 10 is provided to a laser cutting station, shown as laser 60. As shown in FIG. 5, the ribbon 10 provided to laser 60 has a ribbon body having substantially flat upper and lower surfaces 32 and 34. As shown in FIG. 5, prior to formation of grooves 40, ribbon body 12 includes regions 62 of outer layer 28 that will be removed to form grooves 40.

As shown in FIG. 4, laser 60 generates and directs laser beams 64 onto outer surfaces 32 and 34 of ribbon 10 in the desired pattern to form grooves 40, as discussed above. In various embodiments, laser beams 64 remove, cut or ablate a portion of ribbon body 12 to form grooves 40. In various embodiments, laser beams 64 are shaped and/or focused to form the curved surfaces 52 and 54 discussed above, and in a specific embodiment, laser beams 64 are shaped and/or focused to form substantially spherical curved surfaces 52 and 54. In some embodiments, laser beams 64 have an intensity profile that is related to and is adjusted to create the desired shape of curved surfaces 52 and 54. In at least some embodiments, it is believed that inner layer segments 26 provide a layer of protection to optical fibers 16 during laser cutting, which allows for the use of laser 60 to form grooves having a relatively large depth D1, without laser 60 causing damage to optical fibers 16.

It is believed that in contrast to blade-type cutting systems, laser 60 allows for the accurate, fast and consistent formation of the curved surfaces defining grooves 40 as discussed above. Further, it is believed that grooves 40 would be difficult or impossible to form by depositing the ribbon matrix precursor material in the desired pattern followed by curing due to the imprecision of deposition devices that need to start and stop the flow of ribbon material during deposition. In other embodiments, grooves 40 may be formed through other non-contact removal methods such as sand blasting. In other embodiments, grooves 40 may be formed using a blade or grinding tool to remove the material ribbon body 12 to form the desired shape of grooves 40.

In various embodiments, the ribbon bodies discussed herein may be formed by applying a polymer material, such as a UV curable polymer material, around optical fibers 16 in the desired arrangement to form a particular ribbon body. The polymer material is then cured forming the integral, contiguous ribbon body while also coupling the ribbon body to the optical fibers. In other embodiments, the ribbon bodies discussed herein may be formed from any suitable polymer material, including thermoplastic materials and thermoset materials.

It should be understood that the optical ribbons discussed herein can include various numbers of optical fibers 16. In various exemplary embodiments, the optical ribbons discussed herein may include 2, 4, 6, 8, 10, 12, 14, 16, 24, etc. optical fibers or transmission elements (e.g., optical fibers 16). While the ribbon embodiments discussed herein are shown having optical fibers 16 arranged in a substantially parallel, linear array, optical fibers 16 may be arranged in a square array, rectangular array, a staggered array, or any other spatial pattern that may be desirable for a particular application. In various embodiments, optical fibers 16 can include a wide variety of optical fibers including multi-mode fibers, single mode fibers, bend insensitive/resistant fibers, etc. In other embodiment, the optical ribbons discussed herein may include a multi-core optical fiber located within ribbon matrix 12. In this embodiment, a single, integral optical structure having multiple optical transmission elements (e.g., multiple optical cores surrounded by cladding) may be provided, and the single multi-core optical fiber is embedded in one of the stress-isolating ribbon matrix embodiments and/or coated with a coating layer (e.g., inner segment layers 26) as discussed herein. In specific exemplary embodiments, optical fibers 16 may be Corning's Ultra® SMF-28, ClearCurve® LBL and ZBL G.652 compatible optical fibers.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical ribbon comprising:
    a plurality of optical transmission elements each having a longitudinal axis; and
    a multi-layer polymeric ribbon body coupled to, supporting and surrounding the plurality of optical transmission elements, the polymeric ribbon body comprising:
        a plurality of inner layer segments formed from a first polymeric material, each inner layer segment is a contiguous polymer structure at least partially surrounding at least two of the optical transmission elements and having an inner surface contacting outer surfaces of the at least two optical transmission elements; and
        a single contiguous outer layer formed from a second polymeric material and surrounding all of the inner layer segments such that outer surfaces of the inner layer segments contact the outer layer and the outer layer defines a first major surface on one side of the plurality of optical transmission elements and a second major surface on the other side optical transmission elements, wherein a portion of the outer layer is located between each adjacent inner layer segment such that all of the inner layer segments are held together by the outer layer;
    wherein the first major surface defines a first profile, the first profile shaped such that, when viewed in lateral cross-section, a distance between the first and second major surfaces decreases toward a minimum located between adjacent pairs of inner layer segments, wherein the first profile includes a concave curved surface at the minimum thickness, the curved surface having a radius of curvature greater than 0.05 mm.

2. The optical ribbon of claim 1, wherein each of the optical transmission elements has an outer diameter, wherein the minimum thickness is less than the outer diameter of the optical transmission elements.

3. The optical ribbon of claim 2, wherein each of the optical transmission elements has an outer diameter, wherein the minimum thickness is less than 50% of the outer diameter of the optical transmission elements.

4. The optical ribbon of claim 1, wherein the second major surface defines a second profile, the second profile shaped such that, when viewed in lateral cross-section, the second profile includes a concave curved surface at the minimum thickness, the curved surface of the second profile includes a radius of curvature greater than 0.05 mm.

5. The optical ribbon of claim 4, wherein the radius of curvature of the curved surface of the first profile and the radius of curvature of the curved surface of the second profile are less than 0.125 mm.

\* \* \* \* \*